M. A. BARBER.
AUTOMATIC TRAIN PIPE COUPLING.
APPLICATION FILED AUG. 9, 1918.

1,347,835.

Patented July 27, 1920.
2 SHEETS—SHEET 1.

Inventor
Martin A. Barber
L. A. Stanley
Attorney

M. A. BARBER.
AUTOMATIC TRAIN PIPE COUPLING.
APPLICATION FILED AUG. 9, 1918.

1,347,835.

Patented July 27, 1920.
2 SHEETS—SHEET 2.

Inventor
Martin A. Barber
By L. A. Stanley
Attorney

UNITED STATES PATENT OFFICE.

MARTIN A. BARBER, OF CLEVELAND, OHIO, ASSIGNOR TO THE AMERICAN AUTOMATIC CONNECTOR COMPANY, OF CLEVELAND, OHIO, A CORPORATION OF OHIO.

AUTOMATIC TRAIN-PIPE COUPLING.

1,347,835. Specification of Letters Patent. Patented July 27, 1920.

Application filed August 9, 1918. Serial No. 249,183.

*To all whom it may concern:*

Be it known that I, MARTIN A. BARBER, a citizen of the United States, residing at Cleveland, in the county of Cuyahoga and State of Ohio, have invented certain new and useful Improvements in Automatic Train-Pipe Couplings, of which the following is a specification.

The present invention relates to automatic train pipe couplings and more particularly to an interchange or adapter employed for the purpose of connecting the train pipes of a car not equipped with an automatic coupling to the coupler head of a car having such a coupling. The principal objects of the invention are to provide a simple interchange and an improved dependable means for securing the same to the head of an automatic coupler. Other objects and features of novelty will be apparent from the description taken in connection with the drawings in which.

Figure 1:
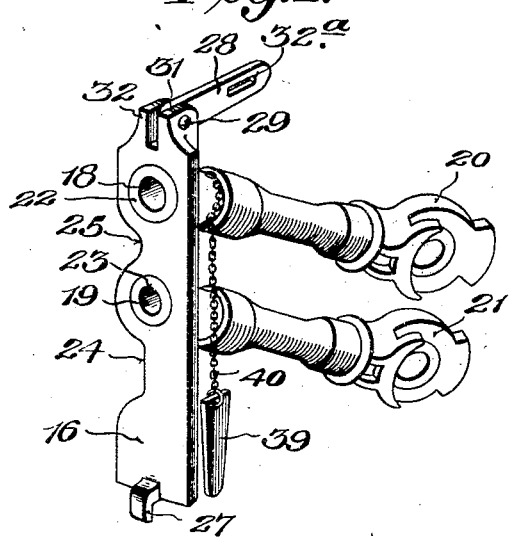
Figure 1 is a perspective view of an interchange constructed in accordance with this invention.
Figure 4:
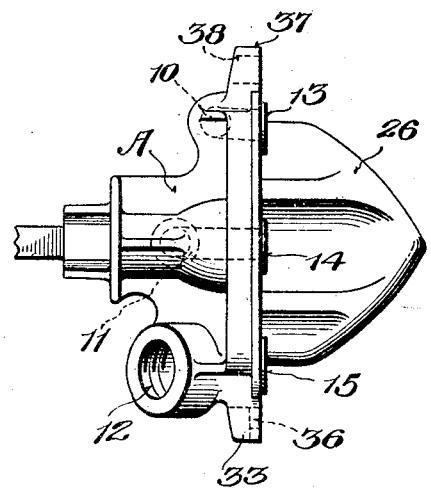
Fig. 4 is a side elevation of an automatic coupler head showing the socket and aperture employed in attaching the interchange thereto.
Figure 2:
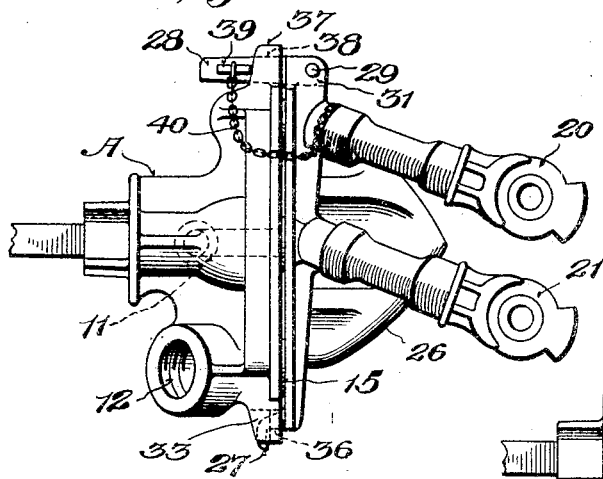
Fig. 2 is a side elevation of a coupler head with the interchange secured thereto.
Figure 5:
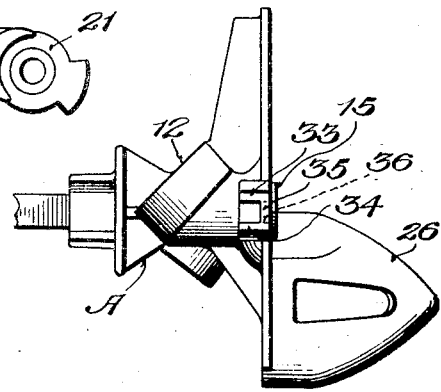
Fig. 5 is a bottom plan view of the coupler head shown in Fig. 4 illustrating the socket formed in the bottom of the head.
Figure 3:
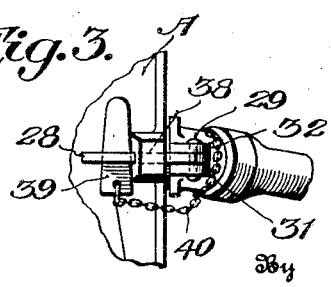
Fig. 3 is a partial top plan view of the parts shown in Fig. 2.
Figure 6:
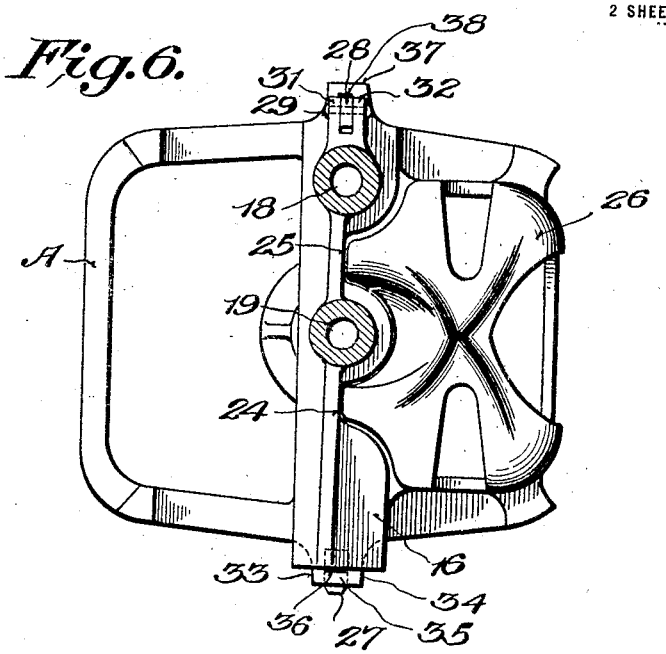
Fig. 6 is a front elevation of a coupler head with the interchange secured thereto.

Referring to the drawings the reference letter A indicates an automatic coupler head which is shown of substantially the form disclosed in my Patents 1,161,403 and 1,161,372, although it is understood that the invention is not limited to this particular construction of coupler head but may be employed with other forms than that shown. As illustrated the head has the usual conduits 10, 11 and 12 for the air signal, air brake and steam pipes, respectively. In the face of the head these conduits have the usual gaskets 13, 14 and 15, which project slightly from the said face.

The interchange comprises a plate 16 having the conduits 18 and 19 which are provided with the couplings 20 and 21 adapted for connection to train pipes in the usual manner. The interchange is constructed to be positioned against the face of the coupler head with the gasket 22 of conduit 18 and gasket 23 of conduit 19 in register with the gaskets 13 and 14 respectively of the head. The interchange here shown is adapted for use with freight cars and hence has no conduit corresponding to the steam pipe conduit of the coupler head, the plate 16 acting as a blind flange to close the conduit 12 in the head. It is to be understood, however, that the interchange may be provided with a steam pipe connection in addition to the others when it is employed with passenger cars or cars having a steam pipe. One side of the frame 16 is formed with the recesses 24 and 25 so that it may be secured to the coupler head without interfering with the projecting guide 26. Obviously, the form and proportion of the plate may be varied to suit other types of coupler heads.

One of the important features of this invention consists in the means for removably securing the interchange to the coupler head. For this purpose, on one side of the interchange, shown as the bottom side, is formed a bent or hook shaped pin 27 which projects in front of the face of the plate 16. The top of the plate, or the side opposite the one having the projecting pin, pivotally carries an arm 28, the pivotal mounting consisting of a pin 29 extending through the arm near one end thereof and carried by the spaced ears 31, 32, the arm being mounted on the pin between these ears. This arm near its free end is formed with a slot 32ª extending transversely therethrough, for a purpose presently to be described.

In order to carry the interchange, the head is formed with a projecting lug at the bottom thereof, this lug comprising spaced substantially parallel side walls 33 and 34 connected by a wall 35, the front of which is flush with the face of the coupler head. This latter wall is formed with an aperture 36 extending therethrough and opening into the space between the parallel walls 33 and 34, thus forming a socket for the pin 27 on the interchange. At the top the head has a lug 37 which is formed with an aperture 38 extending therethrough of a size to receive the arm 28 on the interchange. In applying an interchange to a coupler head, the pin 27 of the former is inserted and held in the socket 36 of the latter and then the arm 28 is thrust through the aperture 38 in the top of the head and the tapered pin 39, attached to the interchange as by means of the flexible connector 40, is driven in the slot 32ª of the arm, one side of the pin bearing against the lug 37 on the head and the other bearing against the opposite end wall of the slot. As the taper of the pin is slight it will be seen that not only is the interchange drawn tightly against the face of the head but the pin will be held securely by the frictional contact with the lug 37 and the end wall of the slot in the arm.

Figure 7:
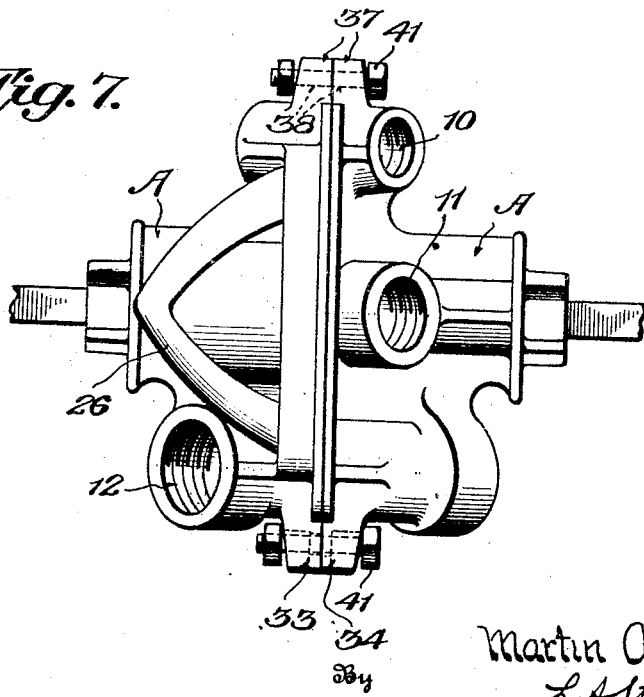
Fig. 7 is a side elevation of a pair of coupler heads illustrating the manner in which the interchange apertures may be utilized as bolt holes to provide an emergency support for one of the heads in case its supporting means should fail.

In addition to providing means for supporting the interchange, the apertures 36 and 38 of the coupler head may also be employed to make an emergency connection between a pair of coupler heads, in case the support for one of the heads should fail. This use of the apertures is illustrated in Fig. 7. Of course if the supporting means for one of the automatic coupler heads should break the train would be held up until the train pipes could be connected up in some manner. With the present construction a very quick emergency connection can be made merely by inserting bolts 41 through the apertures 36 and 38 of the mating coupler heads as clearly shown. Thus the unsupported head will be carried by the uninjured one and the train may proceed, having been delayed only for the few moments required to insert the bolts through the said apertures.

Although an embodiment of the invention has been described in detail, it is to be understood that the invention includes other forms within the scope of the appended claims.

Having thus described the invention what is claimed as new and desired to be secured by Letters Patent is:

1. In combination with an automatic train pipe coupler head, an interchange formed with a conduit having a coupling for connection to a train pipe and means for securing the interchange against the face of the head including a pin at one side of said interchange and an arm at the other, said head being formed with a socket to receive the pin and support the interchange against the head at the pin side, said head also formed with an aperture through which the arm may extend, and means coöperating with said arm and head to draw and secure the interchange tightly against the face of the head.

2. In combination with an automatic train pipe coupler head, an interchange formed with a conduit having a coupling for connection to a train pipe, and means for securing the interchange against the face of the head including a hook shaped pin at one side of said interchange and an arm at the other, said head being formed with an operation to receive the pin and an aperture to receive the arm, the hook on the pin being adapted to engage behind the wall adjacent to one aperture and the arm passing through the other aperture, and means coöperating with said arm and head to draw and secure the interchange tightly against the face of the head.

3. In combination with an automatic train pipe coupler head, an interchange formed with a conduit having a coupling for connection to a train pipe, and means for securing the interchange against the face of the head, including a pin at one side of said interchange and an arm pivoted at the other, said head being formed with a socket to receive the pin and an aperture through which the arm may extend, and means coöperating with said arm and engaging the rear face of the head to draw and secure the interchange tightly against the face of the head.

4. In combination with an automatic train pipe coupler head having an orifice, an interchange formed with a conduit having a coupling for connection to a train pipe, and means for securing the interchange against the face of the head including a hooked pin at one side of said interchange and an arm at the other formed with a slot, said head having a socket to receive the pin with the hooked part behind the wall of the head, and a taper pin in said slot bearing against the rear side of said head to draw and secure the interchange tightly against the face of the head.

5. The combination with an automatic train pipe coupler head having an orifice and a positioning projection and socket on respectively opposite sides of the orifice, and an aperture through the coupler head substantially in vertical alinement with the orifice, and a conduit arranged for connection to the train pipe, means for securing the interchange device to the part of the head which is in substantially vertical alinement with the orifice on the opposite side of the aperture referred to, an arm secured to the interchange device and adapted to extend through said aperture, and means to engage the arm with the rear side of the coupler head to hold the interchange device snugly in engagement with the face of the head.

6. The combination with an automatic train pipe coupler head having a centrally located orifice and a projection on one side of the orifice with a socket on the other, of an interchange device adapted to stand in vertical position against the face of the head, means for connecting the interchange device at one end of the head an arm pivoted to the interchange device at the other end, an aperture through the head through which the arm may extend, a slot in the arm, and a wedge adapted to pass through the slot on the rear face of the head.

7. The combination of an automatic train pipe coupler head having a centrally located orifice, a conical projection on one side of the head and a socket on the other for mutually centering the two heads, the projection having a recess adjacent to the orifice and an interchange device including a bar adapted to lie against the face of the head and having a conduit connected with its central portion, this conduit may lie partially in the recess of the projection, a bar being notched above and below the conduit to accommodate the projection, and means for rigidly securing the bar to the face of the head.

8. An automatic train pipe coupler head formed with an aperture at two opposite sides thereof extending from the face rearwardly through the head, said apertures adapted to receive parts of an interchange or bolts to secure the head to a like head if the supporting means for one of the heads should fail.

In testimony whereof I have affixed my signature.

MARTIN A. BARBER.